US008349071B2

(12) United States Patent  
Boxley et al.

(10) Patent No.: US 8,349,071 B2  
(45) Date of Patent: Jan. 8, 2013

(54) TREATMENT OF FLY ASH FOR USE IN CONCRETE (75) Inventors: Chett Boxley, Park City, UT (US); Akash Akash, Salt Lake City, UT (US); Qiang Zhao, Natick, MA (US)

(73) Assignee: Ceramatec, Inc., Salt Lake City, UT (US)

( * ) Notice: Subject to any disclaimer, the term of this patent is extended or adjusted under 35 U.S.C. 154(b) by 0 days.

(21) Appl. No.: 13/450,286

(22) Filed: Apr. 18, 2012

(65) Prior Publication Data

US 2012/0216716 A1     Aug. 30, 2012

Related U.S. Application Data (62) Division of application No. 11/776,892, filed on Jul. 12, 2007, now Pat. No. 8,172,940.

(51) Int. Cl.
*C04B 18/06* (2006.01)
(52) U.S. Cl. .................................. 106/705; 106/DIG. 1
(58) Field of Classification Search .................. 106/705, 106/DIG. 1
See application file for complete search history.

(56) References Cited

U.S. PATENT DOCUMENTS

| | | | |
|---|---|---|---|
| 4,210,457 A | 7/1980 | Dodson et al. | |
| 4,640,715 A | 2/1987 | Heitzmann et al. | |
| 4,642,137 A | 2/1987 | Heitzmann et al. | |
| 4,842,649 A | 6/1989 | Heitzmann et al. | |
| 4,997,486 A | 3/1991 | Bolsing | |
| 5,399,246 A | 3/1995 | Joshi | |
| 5,601,643 A | 2/1997 | Silverstrim et al. | |
| 5,820,668 A | 10/1998 | Comrie | |
| 5,968,254 A | 10/1999 | Dodgen et al. | |
| 5,997,632 A | 12/1999 | Styron et al. | |
| 6,204,430 B1 | 3/2001 | Baldwin et al. | |
| 6,482,258 B2 | 11/2002 | Styron et al. | |
| 6,802,898 B1 | 10/2004 | Liskowitz et al. | |
| 6,869,473 B2 | 3/2005 | Comrie | |
| 7,141,112 B2 | 11/2006 | Comrie et al. | |
| 7,883,576 B2 | 2/2011 | Comrie et al. | |
| 8,038,789 B2 | 10/2011 | Boxley | |

(Continued)

FOREIGN PATENT DOCUMENTS

EP      0296621 A1     12/1988

(Continued)

OTHER PUBLICATIONS

Gao, Yu-Ming et al., "Effects of Carbon on Air Entrainment in Fly Ash Concrete: The Role of Soot and Carbon Black", *Energy & Fuels*, vol. 11, No. 2 (1997), (1997),457-462.

(Continued)

*Primary Examiner* — Paul Marcantoni  
(74) *Attorney, Agent, or Firm* — David Fonda (57) ABSTRACT

A process for treating fly ash to render it highly usable as a concrete additive. A quantity of fly ash is obtained that contains carbon and which is considered unusable fly ash for concrete based upon foam index testing. The fly ash is mixed with an activator solution sufficient to initiate a geopolymerization reaction and for a geopolymerized fly ash. The geopolymerized fly ash is granulated. The geopolymerized fly ash is considered usable fly ash for concrete according to foam index testing. The geopolymerized fly ash may have a foam index less than 35% of the foam index of the untreated fly ash, and in some cases less than 10% of the foam index of the untreated fly ash. The activator solution may contain an alkali metal hydroxide, carbonate, silicate, aluminate, or mixtures thereof.

19 Claims, 2 Drawing Sheets

U.S. PATENT DOCUMENTS

| | | | |
|---|---|---|---|
| 8,172,940 | B2 | 5/2012 | Boxley et al. |
| 8,177,906 | B2 | 5/2012 | Boxley |
| 2002/0017224 | A1 | 2/2002 | Horton |
| 2003/0188668 | A1 | 10/2003 | Bland |
| 2003/0233962 | A1 | 12/2003 | Dongell |
| 2004/0168611 | A1 | 9/2004 | Dresin et al. |
| 2008/0017077 | A1 | 1/2008 | Abbate |
| 2009/0257948 | A1 | 10/2009 | Fiore et al. |

FOREIGN PATENT DOCUMENTS

| | | |
|---|---|---|
| KR | 1019960028989 | 4/1998 |
| KR | 1020050074538 | 8/2005 |

OTHER PUBLICATIONS

Young, Lee W., "International Search Report", International Application No. PCT/US 08/08461, (Oct. 10, 2008), 1-2.

Young, Lee W., "Written Opinion of the International Searching Authority", International Application No. PCT/US 08/08461, (Oct. 10, 2008), 1-5.

Shin, Sang Hoon "International Search Report", International App. No. PCT/US2009/055909, (Apr. 13, 2010), 1-3.

Shin, Sang Hoon "Written Opinion of the International Searching Authority", International App. No. PCT/US2009/055909, (Apr. 13, 2010), 1-5.

Shin, Sang Hoon "International Search Report", International App. No. PCT/US2009/063911, (Jun. 3, 2010), 1-3.

Shin, Sang Hoon "Written Opinion of the International Searching Authority", International App. No. PCT/US2009/063911, (Jun. 3, 2010), 1-4.

Cha, Keum J., "EPO translation of abstract of KR-1020050074538", (Oct. 19, 2006), 1.

Marcantoni, Paul "Office Action for U.S. Appl. No. 12/275,437", (Sep. 30, 2010), 1-4.

Marcantoni, Paul "Office Action for U.S. Appl. No. 11/776,892", (Sep. 29, 2010), 1-4.

Marcantoni, Paul "Office Action for U.S. Appl. No. 12/553,270", (Apr. 4, 2011), 1-4.

Philar, Ravi "Canadian Office Action", CA 2,692,751 (Oct. 21, 2011), 1-2.

Marcantoni, Paul D., "US Office Action", U.S. Appl. No. 11/776,892 (Nov. 9, 2011), 1-4.

Marcantoni, Paul D., "US Office Action", U.S. Appl. No. 12/275,437 (Oct. 24, 2011), 1-4.

Marcantoni, Paul D., "US Notice of Allowance", U.S. Appl. No. 12/553,270 (Jun. 27, 2011), 1-5.

Im, Nam-Um "Bibliographical Data for KR-10-1996-0028989", Bibliographical Data for KR-10-1996-0028989 (No English Translation of Patent Available), (Apr. 30, 1998), 1-2.

Zhang, et al., "Removal of Ammonium From Aqueous Solutions Using Zeolite Synthesized from Fly Ash by a Fusion Method", Desalination 271 (2011), Elsevier, (Jan. 8, 2011), 111-121.

Verboekend, et al., "Design of Hierarchical Zeolite Catalysts by Desilication", Catal. Sci. Technol., 2011, 1,, (Jul. 4, 2011), 879-890.

Egeblad, et al., "Templating Mesoporous Zeolites", Chem. Mater., vol. 20, No. 3 (2008), (Nov. 30, 2007), 946-960.

Snyder, et al., "Hierarchical Nanomanufacturing: From Shaped Zeolite Nanoparticles to High-Performance Separation Membranes", Agnew. Chem. Int. Ed. 2007, 46 (Wiley-VCH), (Aug. 13, 2007), 7560-7573.

Belviso, et al., "Synthesis of Zeolite from Italian Coal Fly Ash: Differences in Crystallization Temperature using Seawater Instead of Distilled Water", Waste Management, 30, (2010), Elsevier, (Jan. 19, 2010), 839-847.

Kazemian, et al., "Conversion of High Silicon Fly Ash to Na-P1 Zeolite: Alkaline Fusion Followed by Hydrothermal Crystallization", Advanced Powder Technology, 21, (2010), Elsevier, (Dec. 5, 2009), 279-283.

TREATMENT OF FLY ASH FOR USE IN CONCRETE

CROSS-REFERENCE TO RELATED APPLICATION

This application is a divisional of application Ser. No. 11/776,892, filed Jul. 12, 2007 now U.S. Pat. No. 8,172,940, entitled "Treatment for Fly Ash for Use in Concrete" which application is incorporated herein by reference.

U.S. GOVERNMENT INTEREST

This invention was made with government support under Contract No. DE-FG02-05ER84197 awarded by the U.S. Department of Energy. The government has certain rights in the invention.

BACKGROUND OF THE INVENTION

This invention relates to a process for treating fly ash to render it highly usable as a concrete additive. The invention further relates to treated fly ash and to concrete mixtures containing treated fly ash.

Fly ash is the finely divided mineral residue resulting from the combustion of pulverized coal in coal-fired power plants. As used herein, fly ash includes similar ashes produced by the combustion of other fuel materials, including but not limited to bark ash and bottom ash. Fly ash may also include a mixture of different ashes. Fly ash consists of inorganic, incombustible matter present in the coal or fuel that has been fused during combustion into a glassy, amorphous structure.

Fly ash material is solidified while suspended in the exhaust gases and is collected by electrostatic precipitators or filter bags. Since the particles solidify while suspended in the exhaust gases, fly ash particles are generally spherical in shape and range in size from 0.5 μm to 100 μm. They consist mostly of silicon dioxide ($SiO_2$), aluminum oxide ($Al_2O_3$) and iron oxide ($Fe_2O_3$), and are hence a suitable source of aluminum and silicon for geopolymers. They are also pozzolanic in nature and react with calcium hydroxide and alkali to form cementitious compounds.

Fly ash has been classified into two classes, F and C, based on the chemical composition of the fly ash. According to ASTM C 618, the chemical requirements to classify any fly ash are shown in Table 1.

TABLE 1

Chemical Requirements for Fly Ash Classification

| Properties | Fly Ash Class | |
| --- | --- | --- |
| | Class F | Class C |
| Silicon dioxide, aluminum oxide, iron oxide ($SiO_2$ + $Al_2O_3$ + $Fe_2O_3$), min, % | 70.0 | 50.0 |
| Sulfur trioxide ($SO_3$), max, % | 5.0 | 5.0 |
| Moisture Content, max, % | 3.0 | 3.0 |
| Loss on ignition, max, % | 6.0 | 6.0 |

Class F fly ash is produced from burning anthracite and bituminous coals. This fly ash has siliceous or siliceous and aluminous material, which itself possesses little or no cementitious value but will, in finely divided form and in the presence of moisture, chemically react with calcium hydroxide at ordinary temperature to form cementitious compounds. Class C fly ash is produced normally from lignite and sub-bituminous coals, and some class C fly ashes may contain significant amounts (higher than 10%) of calcium oxide (CaO) or lime. This class of fly ash, in addition to having pozzolanic properties, also has some cementitious properties (ASTM C 618-99).

Color is one of the important physical properties of fly ash in terms of estimating the lime content qualitatively. It is suggested that lighter color indicate the presence of high calcium oxide and darker colors suggest high organic content.

Coal combustion exhaust gases sometimes contain contaminants, such as heavy metals, that must be removed to meet environmental standards. This is often accomplished using activated carbon or other similar sorbents. The activated carbon is usually collected by electrostatic precipitators or filter bags together with the fly ash. Hence, the collected fly ash may be combined with carbon and adsorbed heavy metals. The carbon content may range up to 50% by weight, or more. Because bark ash has a high carbon content, fly ash that contains some bark ash may have a high carbon content.

While most fly ash is disposed in landfills or similar large waste containment facilities, increasing amounts of fly ash are used in the production of concrete. Fly ash may partially replace cement and improve several properties of concrete. However, not all fly ash is suitable for use as a concrete additive. For example, fly ash that contains carbon may absorb air entraining agents (AEAs), which are added to concrete in order to improve its workability and resistance toward freeze-thaw damage. When carbon adsorbs air-entraining surfactants, they become less available to entrain tiny air bubbles in the concrete which are required to lend the concrete its protection against freeze-thaw conditions. ASTM C 457 defines a standard test method for microscopical determinations of the air content of hardened concrete and of the specific surface, void frequency, spacing factor, and paste-air ratio of the air-void system in hardened concrete. ASTM C 457 may be used to determine how well the AEA is working. The degree carbon adsorbs AEAs is dependent on the surface area, type of carbon (very coarse particles or soot), and the polarity of the carbon. Activated carbon, the type commonly used to capture heavy metals and other contaminants in flue gases, effectively captures AEAs.

Air entraining agents can be costly. Fly ash is often added to concrete compositions because it is less expensive than the Portland cement it replaces. However, if the addition of fly ash to concrete compositions requires significantly increased amounts of AEAs, then there may be little or no cost savings gained by adding fly ash to the concrete composition. It would be an improvement in the art to provide a process for treating fly ash so that it substantially reduces the amount of AEA added to the concrete composition compared to untreated fly ash.

Concrete manufacturers and concrete users in the construction industry require concrete to have consistent, predictable properties. Fly ash carbon content can vary widely depending upon the source and carbon content. Differences in fly ash can affect the amount of AEA that must be added to produce the desired concrete properties. It would be an advancement in the art to provide a process for treating fly ash that substantially reduces the affect of varying fly ash carbon content.

BRIEF SUMMARY OF THE INVENTION

This invention includes a process for treating fly ash to render it usable as a concrete additive. The invention also includes treated fly ash and concrete mixtures containing the treated fly ash. As used herein, the term concrete refers to a material made by mixing a cementing material, such as Portland cement, an aggregate, such as sand and/or gravel, and sufficient water to cause the cement to set and bind the mixture. Under the foregoing definition, mortar, which comprises a cementing material, sand, and water, may be considered a type of concrete.

In one embodiment of the process of treating fly ash for use as a concrete additive within the scope of the invention, a quantity of fly ash is obtained that contains carbon. The fly ash will typically be considered unusable for concrete based upon foam index testing. Foam index testing, described in greater detail below, is a measure of how much air entraining agent (AEA) must be added to a concrete mixture to be effective. A low foam index test measurement means less AEA must be added to the concrete mixture to produce the desired air entraining effect.

The fly ash is mixed with an activator solution sufficient to initiate a geopolymerization reaction and form a geopolymerized fly ash. The geopolymerized fly ash is granulated. The resulting geopolymerized fly ash is considered, at a minimum, usable fly ash for concrete according to foam index testing. The invention includes geopolymerized fly ash prepared according to the foregoing process and to concrete mixtures comprising the geopolymerized fly ash.

The treated fly ash has a foam index substantially lower than the foam index of untreated fly ash. In some embodiments within the scope of the present invention, the geopolymerized fly ash has foam index typically in the range of 5% to 35% of the foam index of the untreated fly ash. In other embodiments, the geopolymerized fly ash has a foam index less than 20% of the foam index of the untreated fly ash. In yet other embodiments, the geopolymerized fly ash has a foam index less than 15% of the foam index of the untreated fly ash. In still other embodiments, the geopolymerized fly ash has a foam index less than 10% of the foam index of the untreated fly ash.

It has been found that the process of treating fly ash may be repeated one or more times to further lower the foam index test results. In other words, geopolymerized fly ash may be treated again with an activator solution to lower the foam index even more. In some cases, the foam index may be lowered to less than 1% of the foam index of the untreated fly ash.

The activator solution has a pH sufficiently high to initiate the geopolymerization reaction with the fly ash. The activator solution may contain, without limitation, a metal carbonate, a metal silicate, a metal aluminate, a metal sulfate, a metal hydroxide, and mixtures thereof. Alkali metals are presently preferred because of their availability and cost, but the invention is not limited to alkali metals. One mixture comprises an alkali carbonate and an alkali hydroxide. The ingredients of the activator solution need not be specially manufactured or pure ingredients. The activator solution may be prepared using recycled byproducts of industrial processes.

Various techniques may be used to granulate the geopolymerized fly ash, including, but not limited to, spray drying, crushing, grinding, or other similar techniques. In spray drying, the geopolymerized fly ash may be heated to a temperature between 20 and 250° C. to help dry the geopolymerized fly ash. In some embodiments, the geopolymerized fly ash may be heated to a temperature between 20 and 150° C. The granulated, geopolymerized fly ash will typically have a mean particle size between 0.1 and 1000 microns. In some embodiments, the geopolymerized fly ash will have a mean particle size between 10 and 100 microns.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of activator solutions, fly ash, etc., to provide a thorough understanding of embodiments of the invention. One having ordinary skill in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

Disclosed herein is a process for treating fly ash to render it highly usable as a concrete additive. The invention is particularly useful for converting fly ash that is considered unusable for concrete into fly ash that is a useful concrete additive. Such unusable fly ash typically contains carbon and often activated carbon of the type used in coal fired power plants for pollution control. The fly ash may also contain one or more unwanted metals or heavy metals, such as, but not limited to, Hg, As, Fe, Mn, Zn, Cr, Co, Pb, Cu, V, and Mg. The metals may typically be present in the ppm (parts per million) concentration, but may be present at high concentration, in the ppt (parts per thousand) level. Foam index testing, described below, provides a measure of whether a particular fly ash may be used effectively as a concrete additive. Low foam index test results are desirable.

The fly ash is treated within the scope of the present invention by mixing the fly ash with an activator solution sufficient to initiate a geopolymerization reaction and form a geopolymerized fly ash. The geopolymerized fly ash is granulated so it may be more easily used in concrete mixtures. Various techniques may be used to granulate the geopolymerized fly ash, including, but not limited to, spray drying, crushing, grinding, or other similar techniques. The resulting geopolymerized fly ash is usable fly ash for concrete according to foam index testing. Another benefit of the treated fly ash is that unwanted metals or heavy metals are entrapped within the geopolymerized fly ash to inhibit leaching into the environment. The invention includes geopolymerized fly ash prepared according to the foregoing process and to concrete mixtures comprising the geopolymerized fly ash.

The foam index test is a laboratory procedure which determines the adsorption of air-entraining agents in fly ash concrete. In the foam index test, a commercial AEA is added to a fly ash and cement suspension and the suspension is shaken. The added AEA leads to foam formation on top of the liquid surface, which initially behaves in an unstable manner. At the endpoint of the test, the fly ash is "saturated" with the AEA and further addition of the AEA contributes to the foam formation, which eventually becomes stable. The amount of AEA required to obtain stable foam depends on the fly ash quality, where a poor quality fly ash tends to adsorb high amounts of AEA, i.e. more AEA is needed to obtain stable foam.

Foam-index values are based on the amount of air entraining admixture needed in a slurry of 50 mL of water, 4 g of fly ash, and 16 g of cement to produce a layer of foam just covering the surface of liquid in a 473 mL (16 oz) wide mouthed jar after vigorous shaking (Meininger 1981; Gebler and Klieger 1983). There is a good relationship between the minimum amount of admixture in this test necessary to cause foam to cover the surface, without discontinuities, and the admixture dosage needed in concrete containing the same sources of fly ash and cement.

The foam index test procedure used in the following examples is as follows: 4 g of fly ash, 16 g of Portland cement, and 50 mL distilled water are thoroughly mixed in a 4-ounce jar to completely wet the fly ash and cement. This may be accomplished by shaking for about 1 minute. A diluted aqueous solution of AEA is then added dropwise, usually in small increments of about 6 drops (~0.2 mL) at a time. The AEA was Darex® II from W. R. Grace, and it was diluted with distilled water 1:20. It will be appreciated that other AEAs may be used in the foam index test. After each titration, the container is capped and shaken vigorously for 15 seconds, after which time the lid is removed and the liquid surface observed. Prior to the endpoint of the test, the foam on the liquid surface is extremely unstable, the bubbles bursting within a few seconds. If any bubble breaks occur during the 15-second period, then more AEA is added dropwise to the mixture, as described above, until no bubble breaks are observed.

The endpoint is realized when a constant foam is maintained on the surface for at least 45 seconds. A stable foam is achieved when no open areas of liquid show for at least 45 seconds. Bubbles will break rapidly at the AEA levels below the "Index" level. Bubbles will still break for several increments above the "Index" level as well. The number of drops of AEA required to produce this stable foam is referred to as the Foam Index (FI) of the fly ash/cement mixture.

The entire procedure is repeated using 20 g of the cement only thereby yielding a foam index value for the cement. Subtraction of the two values yields an effective foam index for the fly ash. This serves as a measure of the degree to which any given fly ash adsorbs AEAs. (Yu-Ming Gao, Hong-Shig Shim, Robert Hurt, and Eric Suuberg and Nancy Yang, Effects of Carbon on Air Entrainment in Fly Ash Concrete: The Role of Soot and Carbon Black, Energy & Fuels. Vol. 11, No. 2, pp. 457-462, 1996.)

As used herein, a fly ash or treated fly ash that requires fewer than 10 drops of diluted AEA, Darex II, according to the foam index procedure summarized above, is defined to be a premium grade fly ash. A fly ash that requires between 10 drops and 50 drops is defined to be a standard grade fly ash. A fly ash that requires between 50 and 100 drops is defined to be a low-grade fly ash, but one that is still usable. A fly ash that is considered premium grade, standard grade, and low grade, is usable in concrete applications. A fly ash that requires above 100 drops would be considered unusable fly ash for concrete.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLES 1-9

Geopolymerized fly ash was prepared by first preparing an activator solution containing one or more of the following ingredients: $Na_2CO_3$, $Na_2O:SiO_2$, $Na_2O:Al_2O_3$, and NaOH. The activator solution was mixed in a leak proof HDPE (high-density polyethylene) bottle with a screw-on cap. First the required amount (dry weight in grams) of activator was poured into the bottle, then if required, the NaOH (dry weight in grams) was added to the activator solution, and then the required amount of water was added. The bottle was shaken by hand for a few seconds (10-15) to make sure the solution was mixed well. In most cases, the solution temperature rose, so the bottle was set aside until returned to room temperature, which took from a few minutes up to a few hours. Depending on types and amounts of activator, the liquid was clear or had varying degrees of cloudiness.

The required amount of fly ash (1000 g) was weighed out and a small amount of ADVA (plasticizer) was added to it to the mixture prevent clumping. A Class C fly ash was used in the Examples 1-9. It was obtained from an unknown U.S. power plant that was using an unknown activated carbon to control Hg. The fly ash was then poured into the bottle with the room temperature activator solution and the bottle was immediately capped and shaken by hand to mix the ingredients. At this point the geopolymerization reaction began occurring. The slurry was quickly put on an electric paint shaker and shaken vigorously for five minutes. After shaking, the slurry had various degrees of viscosity, due to the different amounts of water and activator used. In general, a thick texture was observed for the mixture. The mixture or slip usually was still pourable into molds at this point. The solution was still "workable." The activator solution compositions for Examples 1-9 are set forth below in Tables 2 and 3.

The resulting geopolymerized fly ash can have a large range of viscosity during mixing (i.e. activator+water+untreated fly ash). The viscosity gradually increases as a function of time; however, different activators introduce different rates of reaction. It was observed that using more water makes the mixture more pourable, but it tends to retard setting time. The mixture will not set up while it is being mixed or agitated. Thus, continued mixing will delay setting and permit continued working of the mixture. However, once mixing stops, the geopolymerized fly ash will set. In some cases it may be desirable to add chemical agents to delay or retard setting. Examples of retardants include, without limitation, borax and borate compounds. Retardants may be desirable or even necessary when the geopolymerized fly ash is spray dried.

The geopolymer mix may be allowed to fully set and cure. It may then be crushed back into a powder using a mortar and pestle, a hammer mill or other crushing device. The crushed powder is then sieved through a #80 mesh. Crushing and sieving are optional steps in the process. Then the sample is foam index tested.

Foam index tests were performed on the geopolymerized fly ash. Foam index results may vary depending on the type of fly ash used, the alkali activator used, the amount of activator, the addition of other alkali hydroxides, amount of water, perhaps time, and maybe even curing temperature. The untreated fly ash required 500 drops or more to pass the foam index. The foam index test was performed three times for each of the geopolymerized fly ash samples prepared using the activator solution of Examples 1-9. Based upon the average foam index test results reported in Table 4, each of the resulting geopolymerized fly ash materials showed a dramatic decrease in the foam index.

TABLE 2

| | Amount (g) | | | | | | | | |
|---|---|---|---|---|---|---|---|---|---|
| Example: | 1 | 2 | 3 | 4 | 5 | 6 | 7 | 8 | 9 |
| Fly Ash (FA) | 1000 | 1000 | 1000 | 1000 | 1000 | 1000 | 1000 | 1000 | 1000 |
| Total $H_2O$ | 400.0 | 400.0 | 400.0 | 400.0 | 400.0 | 400.0 | 400.0 | 400.0 | 400.0 |
| NaOH | | 50.0 | 100.0 | 50.0 | 100.0 | | 100.0 | | 50.0 |
| $Na_2CO_3$ | | | | | | | 40.0 | 80.0 | 133.4 |
| $Na_2O:SiO_2$ | 40.0 | 80.0 | 133.4 | | | | | | |
| $Na_2O:Al_2O_3$ | | | | 40.0 | 80.0 | 133.4 | | | |

TABLE 3

| | Ratio | | | | | | | | |
|---|---|---|---|---|---|---|---|---|---|
| Example: | 1 | 2 | 3 | 4 | 5 | 6 | 7 | 8 | 9 |
| Total $H_2O$:FA | 2:5 | 2:5 | 2:5 | 2:5 | 2:5 | 2:5 | 2:5 | 2:5 | 2:5 |
| NaOH:FA | | 1:20 | 1:10 | 1:20 | 1:10 | | 1:10 | | 1:20 |
| $Na_2CO_3$:FA | | | | | | | 1:25 | 2:25 | 2:15 |
| $Na_2O:SiO_2$:FA | 1:25 | 2:25 | 2:15 | | | | | | |
| $Na_2O:Al_2O_3$:FA | | | | 1:25 | 2:25 | 2:15 | | | |

TABLE 4

Foam Index Test
(FA as received, baseline = 500 drops)

| Example | Test 1 | Test 2 | Test 3 | Foam Avg. | Foam Std. Dev. |
|---|---|---|---|---|---|
| 1 | 55 | 59 | 53 | 56 | 3 |
| 2 | 45 | 41 | 35 | 40 | 5 |
| 3 | 62 | 63 | 58 | 61 | 3 |
| 4 | 81 | 75 | 70 | 75 | 6 |
| 5 | 67 | 60 | 58 | 62 | 5 |
| 6 | 45 | 48 | 47 | 47 | 2 |
| 7 | 60 | 60 | 69 | 63 | 5 |
| 8 | 48 | 45 | 45 | 46 | 2 |
| 9 | 31 | 30 | 32 | 31 | 1 |

It is within the scope of certain aspects of the invention to mix the untreated fly ash with water and alkali activator solution and then prior to fully curing, to spray dry the mixture and form a powder. In other words, heat may optionally be added to the samples to remove the excess water. The components may also be mixed, and while the sample is still wet, use a mortar and pestle or other crushing device, allow the sample to air dry, and then make a powder from that. On a molecular level, the geopolymerization process during curing is similar to polymer chains cross linking to form larger and larger polymers. This is forming the aluminosilicate network during the curing process.

EXAMPLES 10-15

Confirmatory foam index tests were performed on the geopolymerized fly ash prepared in accordance with selected alkali activator solutions in accordance with the procedures of Examples 1-9. The same class C fly ash used in Examples 1-9 was used to prepare geopolymerized fly ash in Examples 10-15. The activator solutions used are summarized in Tables 5 and 6.

TABLE 5

| Example: | Amount (g) | | | | | |
|---|---|---|---|---|---|---|
| | 10 | 11 | 12 | 13 | 14 | 15 |
| Fly Ash (FA) | 1000 | 1000 | 1000 | 1000 | 1000 | 1000 |
| Total H$_2$O | 400.0 | 400.0 | 400.0 | 800.0 | 800.0 | 800.0 |
| NaOH | 50.0 | 50.0 | | 50.0 | 50.0 | |
| Na$_2$CO$_3$ | 133.4 | | 133.4 | 133.4 | | 133.4 |
| Na$_2$O:SiO$_2$ | | 80.0 | | | 80.0 | |

TABLE 6

| Example: | Ratio | | | | | |
|---|---|---|---|---|---|---|
| | 10 | 11 | 12 | 13 | 14 | 15 |
| Total H$_2$O:FA | 2:5 | 2:5 | 2:5 | 4:5 | 4:5 | 4:5 |
| NaOH:FA | 1:20 | 1:20 | | 1:20 | 1:20 | |
| Na$_2$CO$_3$:FA | 2:15 | | 2:15 | 2:15 | | 2:15 |
| Na$_2$O:SiO$_2$:FA | | 2:25 | | | 2:25 | |

Foam index tests were performed on the geopolymerized fly ash of Examples 10-15. The foam index test was performed three times for each of the geopolymerized fly ash samples prepared using the activator solution of Examples 10-15. Based upon the average foam index test results reported in Table 7, each of the resulting geopolymerized fly ash materials showed a dramatic decrease in the foam index.

TABLE 7

Foam Index Test
(FA as received, baseline = 500 drops)

| Example | Test 1 | Test 2 | Test 3 | Foam Avg. | Foam Std. Dev. |
|---|---|---|---|---|---|
| 10 | 36 | 31 | 34 | 34 | 3 |
| 11 | 34 | 32 | 31 | 32 | 2 |
| 12 | 59 | 61 | 66 | 62 | 4 |
| 13 | 18 | 20 | 16 | 18 | 2 |
| 14 | 30 | 35 | 32 | 32 | 3 |
| 15 | 45 | 40 | 44 | 43 | 3 |

EXAMPLES 16-24

Geopolymerized fly ash and activator solutions were prepared according to the procedure of Examples 1-9 based upon the activator solution ingredients set forth in Tables 8 and 9. A different fly ash sample was used in Examples 16-24. The sample was a class C fly ash type obtained from an unknown U.S. power plant that was using an unknown activated carbon to control Hg. The untreated fly ash required 180 drops or more to pass the foam index test.

TABLE 8

| Example: | Amount (g) | | | | | | | | |
|---|---|---|---|---|---|---|---|---|---|
| | 16 | 17 | 18 | 19 | 20 | 21 | 22 | 23 | 24 |
| Fly Ash (FA) | 1000 | 1000 | 1000 | 1000 | 1000 | 1000 | 1000 | 1000 | 1000 |
| Total H$_2$O | 400.0 | 400.0 | 400.0 | 400.0 | 400.0 | 400.0 | 400.0 | 400.0 | 400.0 |
| NaOH | | 50.0 | 100.0 | 50.0 | 100.0 | | 100.0 | | 50.0 |
| Na$_2$CO$_3$ | | | | | | | 36.0 | 72.0 | 120.0 |
| Na$_2$O:SiO$_2$ | 36.0 | 72.0 | 120.0 | | | | | | |
| Na$_2$O:Al$_2$O$_3$ | | | | 36.0 | 72.0 | 120.0 | | | |

TABLE 9

| | Ratio | | | | | | | | |
|---|---|---|---|---|---|---|---|---|---|
| Example: | 16 | 17 | 18 | 19 | 20 | 21 | 22 | 23 | 24 |
| Total H$_2$O:FA | 2:5 | 2:5 | 2:5 | 2:5 | 2:5 | 2:5 | 2:5 | 2:5 | 2:5 |
| NaOH:FA | | 1:20 | 1:10 | 1:20 | 1:10 | | 1:10 | | 1:20 |
| Na$_2$CO$_3$:FA | | | | | | | 1:28 | 1:14 | 2:17 |
| Na$_2$O:SiO$_2$:FA | 1:28 | 1:14 | 2:17 | | | | | | |
| Na$_2$O:Al$_2$O$_3$:FA | | | | 1:28 | 1:14 | 2:17 | | | |

Foam index tests were performed on the geopolymerized fly ash of Examples 16-24. The foam index test was performed three times for each of the geopolymerized fly ash samples prepared using the activator solution of Examples 16-24. Based upon the average foam index test results reported in Table 10, each of the resulting geopolymerized fly ash materials showed a dramatic decrease in the foam index.

TABLE 10

Foam Index Test
(FA as received, baseline = 180 drops)

| Example | Test 1 | Test 2 | Test 3 | Foam Avg. | Foam Std. Dev. |
|---|---|---|---|---|---|
| 16 | 29 | 30 | 27 | 29 | 2 |
| 17 | 15 | 18 | 18 | 17 | 2 |
| 18 | 56 | 59 | 61 | 59 | 3 |
| 19 | 28 | 31 | 30 | 30 | 2 |
| 20 | 13 | 12 | 12 | 12 | 1 |
| 21 | 13 | 13 | 12 | 13 | 1 |
| 22 | 17 | 16 | 15 | 16 | 1 |
| 23 | 24 | 23 | 21 | 24 | 2 |
| 24 | 9 | 8 | 10 | 9 | 1 |

EXAMPLES 25-30

Confirmatory foam index tests were performed on the geopolymerized fly ash prepared in accordance with selected alkali activator solutions in accordance with the procedures of Examples 16-24. The same class C fly ash used in Examples 16-24 was used to prepare geopolymerized fly ash in Examples 25-30. The activator solutions used are summarized in Tables 11 and 12.

TABLE 11

| | Amount (g) | | | | | |
|---|---|---|---|---|---|---|
| Example: | 25 | 26 | 27 | 28 | 29 | 30 |
| Fly Ash (FA) | 1000 | 1000 | 1000 | 1000 | 1000 | 1000 |
| Total H$_2$O | 400.0 | 400.0 | 400.0 | 800.0 | 800.0 | 800.0 |
| NaOH | 50.0 | | | 50.0 | | |
| Na$_2$CO$_3$ | 72.0 | 72.0 | 120.0 | 72.0 | 72.0 | 120.0 |

TABLE 12

| | Ratio | | | | | |
|---|---|---|---|---|---|---|
| Example: | 25 | 26 | 27 | 28 | 29 | 30 |
| Total H$_2$O:FA | 2:5 | 2:5 | 2:5 | 4:5 | 4:5 | 4:5 |
| NaOH:FA | 1:20 | | | 1:20 | | |
| Na$_2$CO$_3$:FA | 1:14 | 1:14 | 2:17 | 1:14 | 1:14 | 2:17 |

Foam index tests were performed on the geopolymerized fly ash of Examples 25-30. The foam index test was performed three times for each of the geopolymerized fly ash samples prepared using the activator solution of Examples 25-30. Based upon the average foam index test results reported in Table 13, each of the resulting geopolymerized fly ash materials showed a dramatic decrease in the foam index.

TABLE 13

Foam Index Test
(FA as received, baseline = 180 drops)

| Example | Test 1 | Test 2 | Test 3 | Foam Avg. | Foam Std. Dev. |
|---|---|---|---|---|---|
| 25 | 9 | 10 | 8 | 9 | 1 |
| 26 | 20 | 19 | 20 | 20 | 1 |
| 27 | 35 | 40 | 39 | 38 | 3 |
| 28 | 26 | 28 | 25 | 26 | 2 |
| 29 | 20 | 21 | 18 | 20 | 2 |
| 30 | 23 | 22 | 24 | 23 | 1 |

The foam index test results reported in Tables 4, 7, 10, and 13 indicate that the foam index for geopolymerized fly ash within the scope of the present invention is significantly lower than the foam index for the untreated fly ash. Indeed, the foam index for the geopolymerized fly ash used in Examples 1-9 ranged from about 6% to 15% of the untreated fly ash. Similarly, the foam index for the geopolymerized fly ash used in Examples 16-24 ranged from about 5% to about 33% of the untreated fly ash. In some embodiments, the geopolymerized fly ash may have a foam index ranging from about 5% to 35% of the foam index for the untreated fly ash. In some embodiments, the geopolymerized fly ash may have a foam index less than 20% of the untreated fly ash. In other embodiments, the geopolymerized fly ash may have a foam index less than 15% of the untreated fly ash. In yet other embodiments, the geopolymerized fly ash may have a foam index less than 10% of the untreated fly ash.

Figure 1:
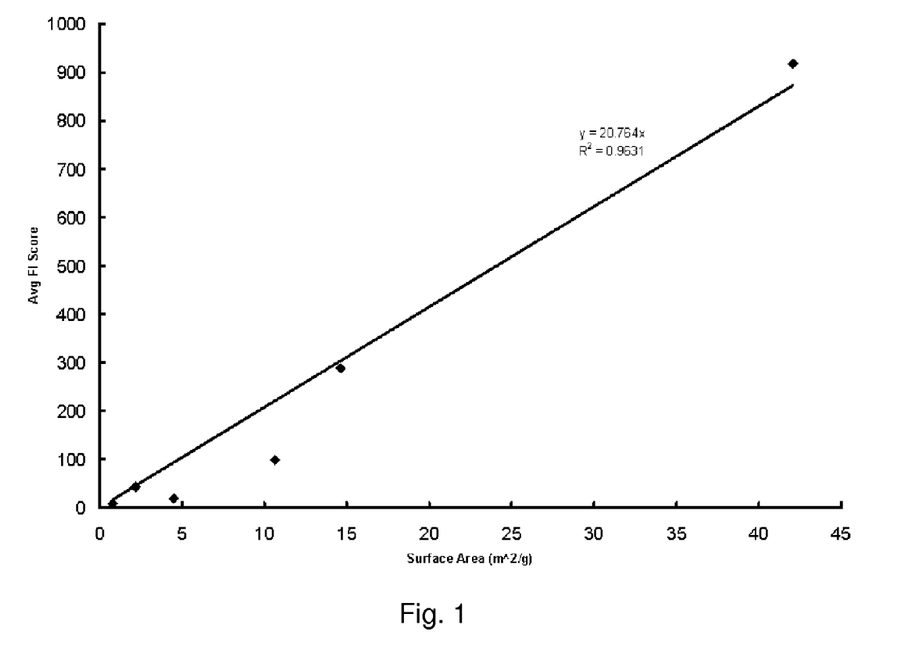
FIG. 1 is a graph comparing foam index results with surface area for untreated fly ash.

In Examples 1-30, the fly ash was granulated using a mortar and pestle. Without being bound by theory, it is presently believed that the surface area of the sample is related to its foam index score before treatment. FIG. 1 shows preliminary data suggesting that surface area may affect foam index.

Figure 2:
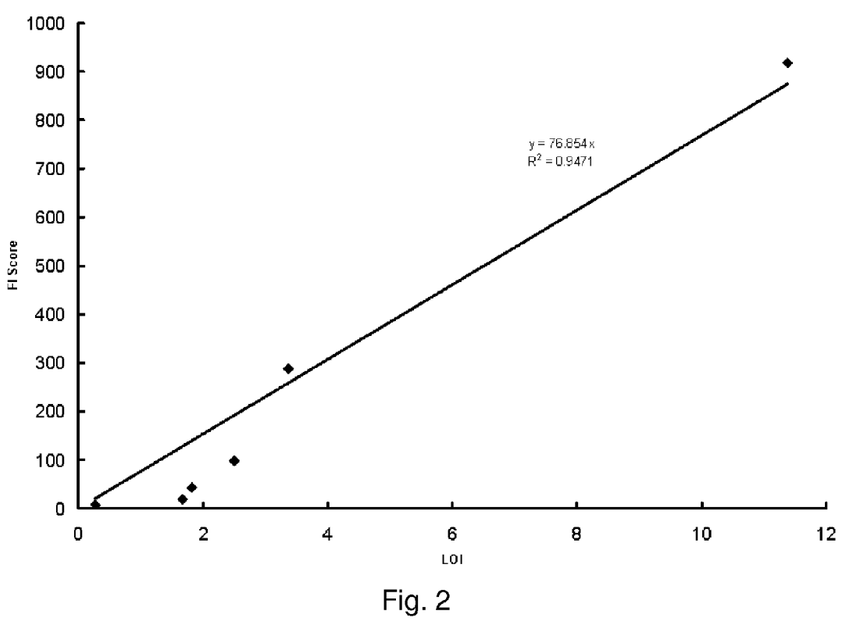
FIG. 2 is a graph comparing foam index results with loss on ignition (LOI) for untreated fly ash.

Traditionally those who use fly ash in concrete mixtures look at foam index as a function of measured LOI (loss on ignition). However, LOI usually refers to the unburned natural carbon that is in the fly ash sample. However, if the source of carbon is activated carbon for Hg control, then such carbon has a high surface area carbon that only marginally increases the LOI, but has an exponential effect on the foam index. In other words 1% LOI of natural carbon may only adsorb 20 drops of AEA, but 1% LOI of activated carbon may adsorb 1000 drops of AEA. FIG. 2 contains an example of the traditional comparison of foam index and LOI.

The results of Examples 1-30 suggest that the different activator solutions have different effects on the geopolymerized fly ash. The sodium carbonate activators appeared to produce the lowest foam index results. The alkali activator solutions need an alkali present and of course have a high pH. NaOH may be used as an activator alone, but it may not provide optimum results compared to the activator solutions listed above. An optimum alkali activator is one that costs next to nothing and requires the least amount of activator to lower the foam index to an acceptable lever. Performance and material costs may be balanced selecting the activator solution.

EXAMPLE 31

It has been found that the process of treating fly ash may be repeated one or more times to further lower the foam index test results. Geopolymerized fly ash and an activator solution containing sodium carbonate (30% by weight) were prepared according to the general procedure of Examples 1-9. A different fly ash sample was used in Example 31. The sample was a class C fly ash type obtained from an unknown U.S. power plant that was using an unknown activated carbon to control Hg. The untreated fly ash required about 950 drops to pass the foam index test. One part activator solution to 1.5 parts fly ash were treated and granulated. After the foregoing treatment, the foam index score for this geopolymerized fly ash was about 200. After granulation the geopolymerized fly was treated a second time using 1 part activator solution to 1.5 parts of geopolymerized fly ash. After the second treatment the foam index score was 5.

EXAMPLE 32

Geopolymerized fly ash and an activator solution were prepared according to the procedure of Example 31, except that 1 part activator solution was added to 3 parts fly ash. After the first treatment, the foam index score for this geopolymerized fly ash was about 250. After granulation the geopolymerized fly was treated a second time using 1 part activator solution to 3 parts of geopolymerized fly ash. After the second treatment the foam index score was 15.

EXAMPLE 33

Geopolymerized fly ash and an activator solution are prepared according to the procedure of Example 31, except that 1 part activator solution is added to 50 parts fly ash. After the first treatment, the foam index score for geopolymerized fly ash is measured to be less than the initial foam index score. After granulation the geopolymerized fly is treated a second time using 1 part activator solution to 50 parts of geopolymerized fly ash. After the second treatment the foam index score is measured to be less than the first foam index score. After granulation the geopolymerized fly is treated a third time using 1 part activator solution to 50 parts of geopolymerized fly ash. After the third treatment the foam index score is measured to be less than the second foam index score.

From Examples 31-33, geopolymerized fly ash may be treated multiple times with an activator solution to progressively lower the foam index even more. If desired, the foam index may be lowered to less than 1% of the foam index of the untreated fly ash. The process may be tailored to produce treated fly ash having any desired foam index score.

While specific embodiments of the present invention have been illustrated and described, numerous modifications come to mind without significantly departing from the spirit of the invention, and the scope of protection is only limited by the scope of the accompanying claims.

The invention claimed is:

1. A geopolymerized fly ash generated by a method comprising the steps of:
    obtaining a quantity of fly ash that contains carbon and has a foam index;
    mixing the fly ash with an activator solution sufficient to initiate a geopolymerization reaction and form a geopolymerized fly ash; and
    granulating the geopolymerized fly ash, wherein the geopolymerized fly ash is considered, at a minimum, usable fly ash for concrete according to foam index testing.

2. The geopolymerized fly ash of claim 1, wherein the activator solution comprises an activator selected from the group consisting of a metal carbonate, a metal silicate, a metal aluminate, a metal sulfate, a metal hydroxide, and mixtures thereof.

3. The geopolymerized fly ash of claim 1, wherein the activator solution comprises a metal carbonate.

4. The geopolymerized fly ash of claim 1, wherein the activator solution comprises a metal hydroxide.

5. The geopolymerized fly ash of claim 1, wherein the ratio of activator to fly ash is between 1:50 and 10:1.

6. The geopolymerized fly ash of claim 1, wherein the geopolymerized fly ash is granulated by spray drying.

7. The geopolymerized fly ash of claim 1, wherein the geopolymerized fly ash is heated to a temperature between 20 and 250° C.

8. The geopolymerized fly ash of claim 1, wherein the geopolymerized fly ash is granulated by crushing.

9. The geopolymerized fly ash of claim 1, wherein the granulated, geopolymerized fly ash has a mean particle size between 0.1 and 1000 microns.

10. The geopolymerized fly ash of claim 1, wherein the granulated, geopolymerized fly ash has a mean particle size between 10 and 100 microns.

11. The geopolymerized fly ash of claim 1, wherein the geopolymerized fly ash is considered premium grade for concrete based upon foam index testing.

12. The geopolymerized fly ash of claim 1, wherein the geopolymerized fly ash is considered standard grade for concrete based upon foam index testing.

13. The geopolymerized fly ash of claim 1, wherein the fly ash contains one or more heavy metals.

14. The geopolymerized fly ash of claim 1, further comprising the step of mixing the granulated and geopolymerized fly ash with an activator solution sufficient to initiate a second geopolymerization reaction and form a second geopolymerized fly ash.

15. The geopolymerized fly ash of claim 1, wherein the geopolymerized fly ash has foam index less than 35% of the foam index of the untreated fly ash.

16. A geopolymerized fly ash generated by a method comprising the steps of:
    obtaining a quantity of fly ash that contains carbon and has a foam index;
    mixing the fly ash with an activator solution sufficient to initiate a geopolymerization reaction and form a geopolymerized fly ash, wherein the ratio of activator to fly ash is between 1:50 and 10:1;

heating the geopolymerized fly ash to a temperature between 20 and 250° C.; and granulating the geopolymerized fly ash, wherein the geopolymerized fly ash has foam index less than 35% of the foam index of the untreated fly ash, and wherein the granulated, geopolymerized fly ash has a mean particle size between 0.1 and 1000 microns.

17. The process according to claim 16, wherein the geopolymerized fly ash has a foam index less than 20% of the foam index of the untreated fly ash.

18. The process according to claim 16, wherein the geopolymerized fly ash has a foam index less than 10% of the foam index of the untreated fly ash.

19. The process according to claim 16, further comprising the step of mixing the granulated and geopolymerized fly ash with an activator solution sufficient to initiate a second geopolymerization reaction and form a second geopolymerized fly ash.

* * * * *